Jan. 22, 1957 J. B. LINDSAY 2,778,386
GRID WINDING MACHINE
Filed Oct. 28, 1952 8 Sheets-Sheet 2

INVENTOR.
James B. Lindsay
BY
Norman N. Holland
ATTORNEY

United States Patent Office 2,778,386
Patented Jan. 22, 1957

2,778,386
GRID WINDING MACHINE

James B. Lindsay, Milburn, N. J., assignor to Kahle Engineering Company, North Bergen, N. J., a co-partnership Application October 28, 1952, Serial No. 317,295

8 Claims. (Cl. 140—71.5)

The present invention relates to winding apparatus, more particularly to improvements in winding machines for winding grid electrodes such, for example, as are used in electron tubes.

More particularly, the invention relates to the manufacture of grids comprising a plurality of parallel support wires with the grid wire wound about the support wires in a helical fashion. The grid wire is placed in notches on the side support wires, and the notches are peened over to grip the wire. In one automatic run, the machine winds a grid strip long enough to be divided into many individual grid elements. This grid strip is left unnotched and unpeened at intervals along the side wires to allow removal of the several turns of grid wire between the individual grid elements after they are cut from the longer strip to provide mounting legs for the grid elements.

The continuing trend toward the use of smaller and smaller electron tubes has required the manufacture of smaller and smaller grid elements. These elements have smaller diameter side and grid wires and require extremely high pitch windings. Production of such grids requires high precision winding machinery with ability to function at high speeds with close tolerances. Present grid winding machines wind such fine grids with great difficulty since they are machines designed for coarser work which have been refined by a series of modifications to handle the smaller modern grids.

A particular object of this invention, therefore, is to provide a grid winding machine designed specifically for the production at high speed of grids of high pitch and of highest precision with minimum labor and maintenance requirements.

Another object is to provide a grid winding machine with smooth and sensitive operation to allow the use of fine grid wire.

Another object is to provide a machine which is free of vibration.

Another object is to provide a machine which has sufficient flexibility of adjustment to enable grids of any desired pitch including either a uniform or a variable pitch to be produced by simple adjustments.

Another object is to allow the total number of turns on each grid to be wound on automatically within an accuracy of a fraction of a turn.

Another object is to allow the removal of one completed grid strip from the machine and the start of another without any change in leg length at the ends of the windings.

Another object is to allow the operator to stop the rotation of the winding machine in a fraction of a turn of the side wires.

Another object is to provide accurate oppositely disposed swage supports on the side wires in predetermined positions relative to the windings to assist in the mounting of mica spacers on the grids.

Another object is to effect automatic relocations of the peening tool upon a change of the pitch of the winding.

Another object is to provide a machine which will operate at high speed.

Another object is to eliminate crowding of parts in the area of the notching and peening tools.

Another object is to automatically control notching and peening wheel operation to prevent notching and peening between separate grid elements on the grid strip.

Other and further objects of the invention will be obvious upon an understanding of the illustrated embodiment about to be described or will be indicated in the appended claims, and various advantages not referred to herein will occur to one skilled in the art.

A preferred embodiment of the invention has been selected for purposes of illustration and description and is shown in the accompanying drawings wherein:

Fig. 4b is a plan view of the right hand portion of the grid winding machine with parts in section;

Fig. 6 is a side elevational view in section of the headstock;

Fig. 7b is a sectional view along the line 7b—7b of Fig. 7a;

A preferred embodiment of the machine may be generally described as a lathe-like stand with an attached motor drive. At one end of the stand and on top are mounted a plurality of spools of wire from which the supporting grid side wires are fed longitudinally through and rotated by a rotating mandrel. The grid wire is fed to the side wires so that as they rotate the grid wire is wound helically around them. In order to form the winding as a helix, the side wires are drawn constantly and longitudinally along the top of the stand by a lead screw device which is turned to rotate with the side wires as it draws them along.

The supporting side wires are notched at each revolution on their outer edge as they are carried under a notching wheel. The notch is spaced to engage the grid wire as it is wound on the side wires by their rotating action. After the grid wire has been wound into the notch on the side wire, the turning side wires and lead screw motion bring the notch to a peening wheel. This wheel closes the notch about the grid wire and thus attaches the grid wire to the side wire. When the lead screw which is drawing the side wires has reached its extreme position, the machine is automatically stopped and the side wires are cut at a point which has passed the peening wheel and a finished grid strip is removed from the machine.

A grid strip has been formed whose length is equal to the distance the lead screw travels. This strip is cut into a number of individual grid elements. It is necessary to remove several turns of the grid wire from each end of the grid element. In order to facilitate this removal, these portions are not notched or peened by the grid machine during the winding operations. A cam shaft is used to control this action. One cam is cut so that after the desired number of turns are placed on the side wires for a grid element, the notching wheel is turned away from the side wires for a given number of turns. A second cam similarly moves the peening wheel away for the same interval. A third cam on the cam shaft controls a swaging tool which notches the grid strip at appropriate points to provide stops for mica spacers which will later be slipped over the grid elements. A fourth cam provides an independent motion to the lead screw to provide a variable pitch for the grid winding and a fifth cam automatically corrects the peening wheel location to compensate for pitch changes.

The grid wire is fed from a spool and is led to the winding point by a series of spring tensioned levers which in combination with a brake keep the grid wire itself in proper tension. Preferably, a hysteresis brake is used with the spool to control this wire tension.

Figure 1:
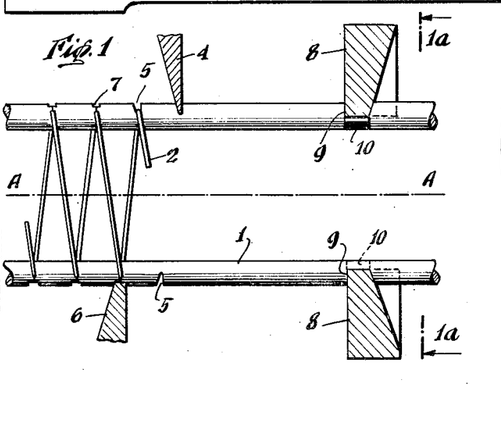
Fig. 1 is a detailed view of the grid side wires showing the process of forming a grid.

Referring to the drawings which shows a preferred embodiment of the machine, Fig. 1 illustrates the notching, peening, and swaging operations performed on a grid having two side wires.

The side wires 1 are moving in a direction parallel to axis A—A at the same time as they are rotating about it. Notching wheel 4 is so positioned that the rotating side wires turn against its edge resulting in the notch 5. After the wires complete one full rotation from the notching wheel, the lead screw has moved the notch to a position where the wire 2 is laid into the unpeened notch 5. Another half rotation of the side wires brings the notch and wire into contact with the peening wheel 6 to fasten the grid wire 2 to the side wire 1. The swaging tool 8 forms two swages 10 (Fig. 1a), one on each side wire, when it is moved into position for one half of a revolution of the side wires.

Figure 2:
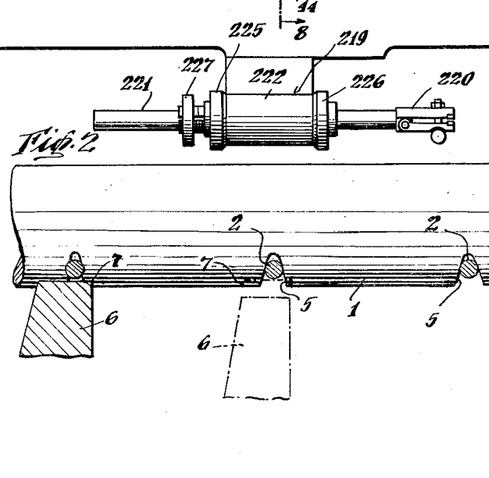
Fig. 2 is an enlarged detailed view of the peening operation on the side wires.

Fig. 2 shows in detail the closing of notch 5 by peening wheel 6.

Figures 1, 3, 15:
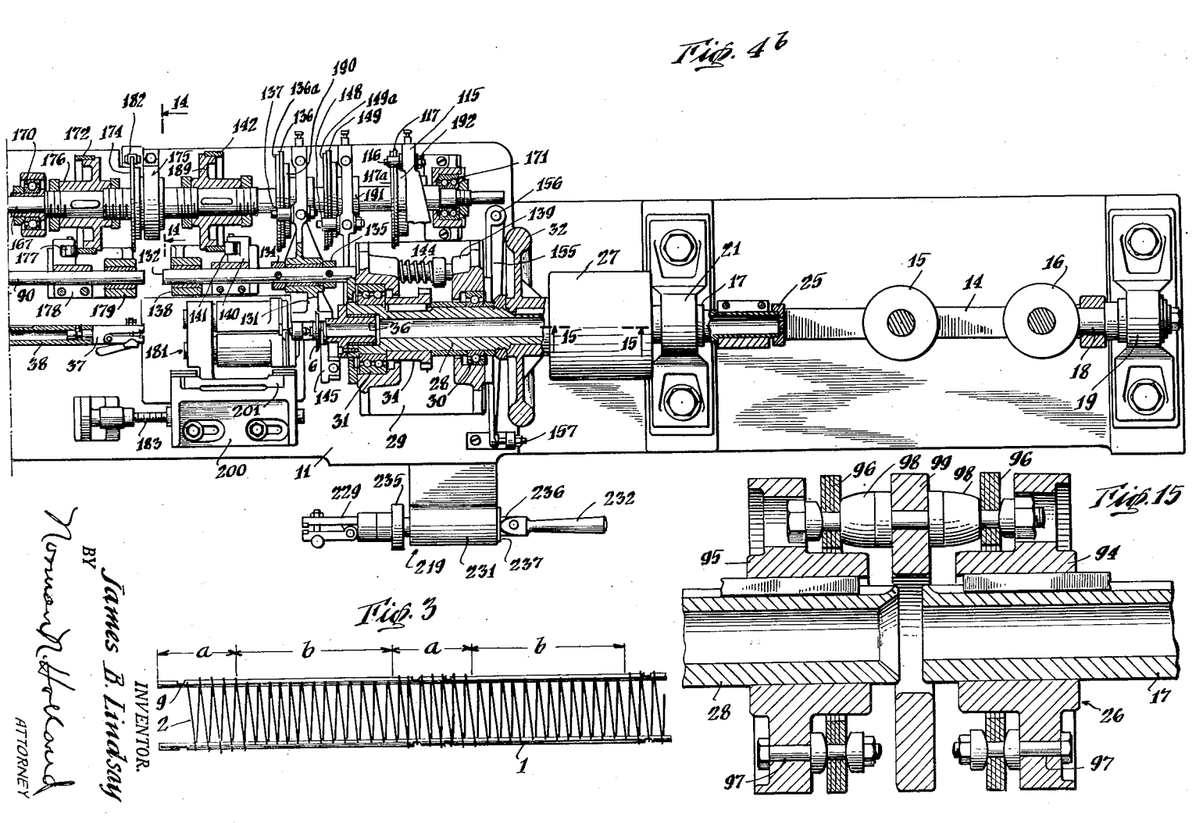
Fig. 3 is an elevational view of a portion of the grid strip as it comes from the machine.
Fig. 15 is a detailed sectional view along the line 15—15 of Fig. 4b showing the flexible coupling.
Figure 1A:
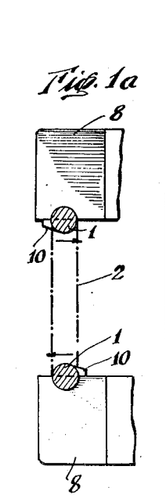
Fig. 1a is a sectional view along the line 1a—1a of Fig. 1.

Fig. 3 shows a portion of the grid strip with the grid wire fastened in length $b$ and left unfastened in length $a$.

*Side wire supply and spindle structure*

In the drawings, particularly Figs. 4a, 4b, 5a, and 5b, 11 designates the bed plate of the machine which is mounted upon supporting legs 12. Both the bed and legs are extra heavy and oversized to provide an extremely rigid mounting allowing fine adjustments to be made and maintained.

Mounted upon the bed plate 11 are brackets 19 and 21 (Fig. 5b) which rotatably support by bearings 20 and 22 and shafts 17 and 18 the spool carrying yoke 14. In order to reduce vibration caused by the high rotation speed of the spool yoke, the spool yoke is dynamically balanced and the bearings 20 and 22 are precision, preloaded, extra large ball bearings. The side wires are drawn from spools carried by yoke 14 through yoke wire guide bracket 25 and hollow shaft 17. The number of spools corresponds to the number of side wires used. Figs. 4b and 5b show two spools 15 and 16 for a two side wire grid. However, a greater number of side wires may be provided for different shapes of grids. Shaft 17 is fastened to yoke 14, and the other end is fastened to the flexible coupling 26 (Fig. 15) which is covered by shield 27. The coupling 26 is a flexible coupling between shaft 17 and head stock spindle 28. This flexible coupling has flanges 94 and 95 keyed to shaft 17 and hollow spindle 28. The two flanges are interconnected by spring steel disks 96 which are bolted to the flange plates by bolts 97 and to each other by bolt assembly 98 and coupling disk 99. This provides a shock absorbing type of coupling which reduces vibration from the rotating spool yoke while at the same time having no backlash.

The spindle 28 (Fig. 5b and 6) is mounted on ball bearings 30 and 31 in the head stock 29. The main spindle is made over size and the ball bearings 30 and 31 are precision, pre-loaded, extra-large bearings to reduce vibration and to provide for precision work. Head stock sprocket 34 drives the spindle 28 and the spool yoke 14 through coupling 26. Hand wheel 32 is attached to the spindle 28 to allow the operator to turn the spindle by hand for adjustments and for accurate cutting of the grid strips. Head stock sprocket 34 is driven by silent chain belt 35. The side wires pass through the coupling 26 thence through the hollow spindle 28. At the left end of spindle 28 the wires pass through mandrel 100 (Fig. 6) which is supported and rotated by the head stock spindle nose 36.

*Side wire feed mechanism*

Figure 4A:
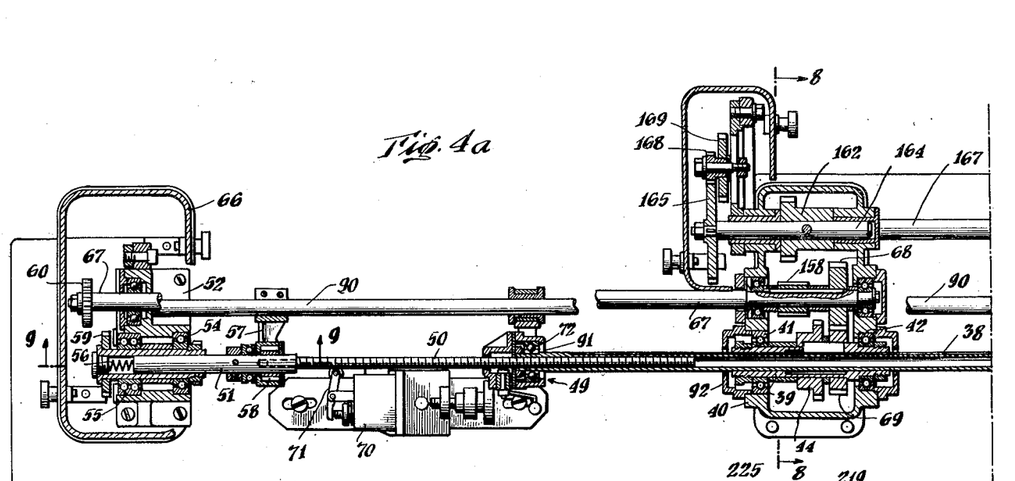
Fig. 4a is a plan view of the left hand portion of the grid winding machine with parts in section.
Figure 5:
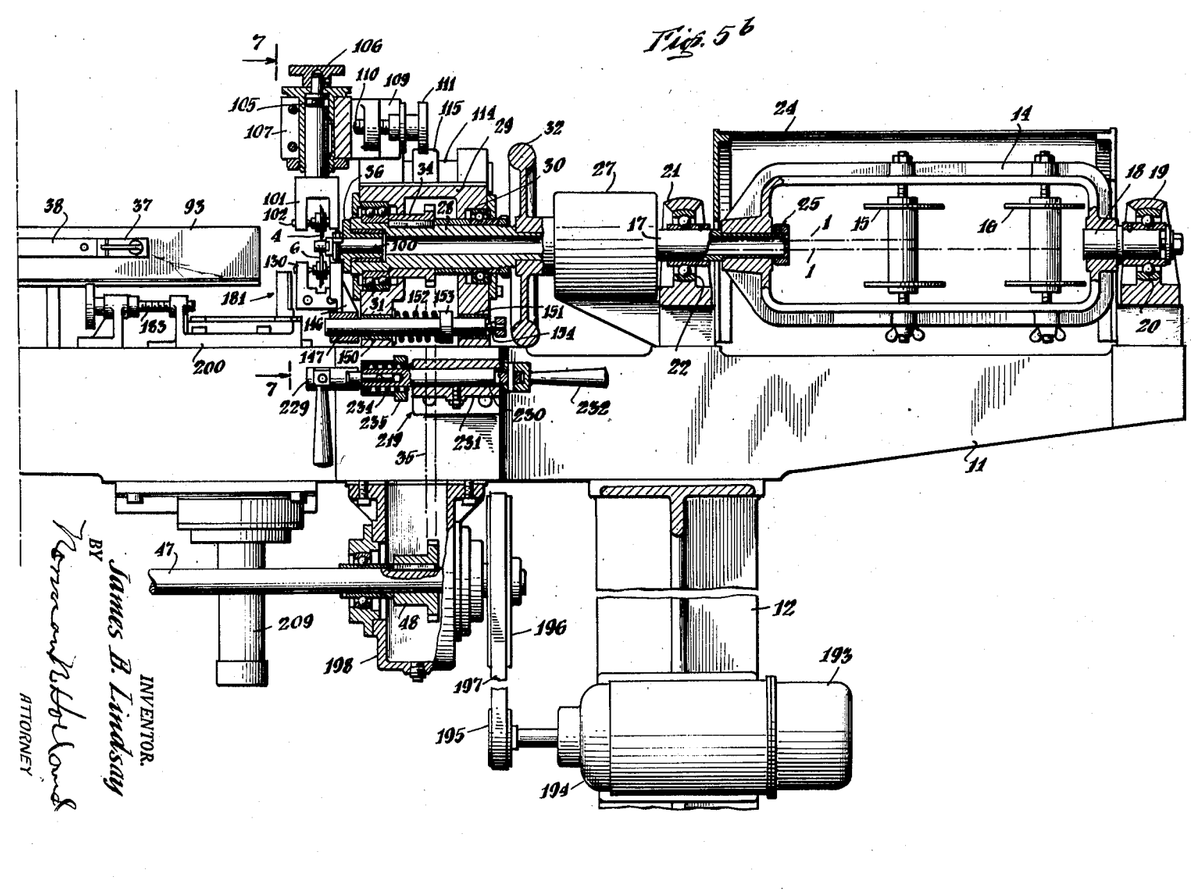
Fig. 5a is a side elevational view of the left hand portion of the grid winding machine with parts in section.
Fig. 5b is a side elevational view of the right hand portion of the grid winding machine with parts in section.
Figure 5A:
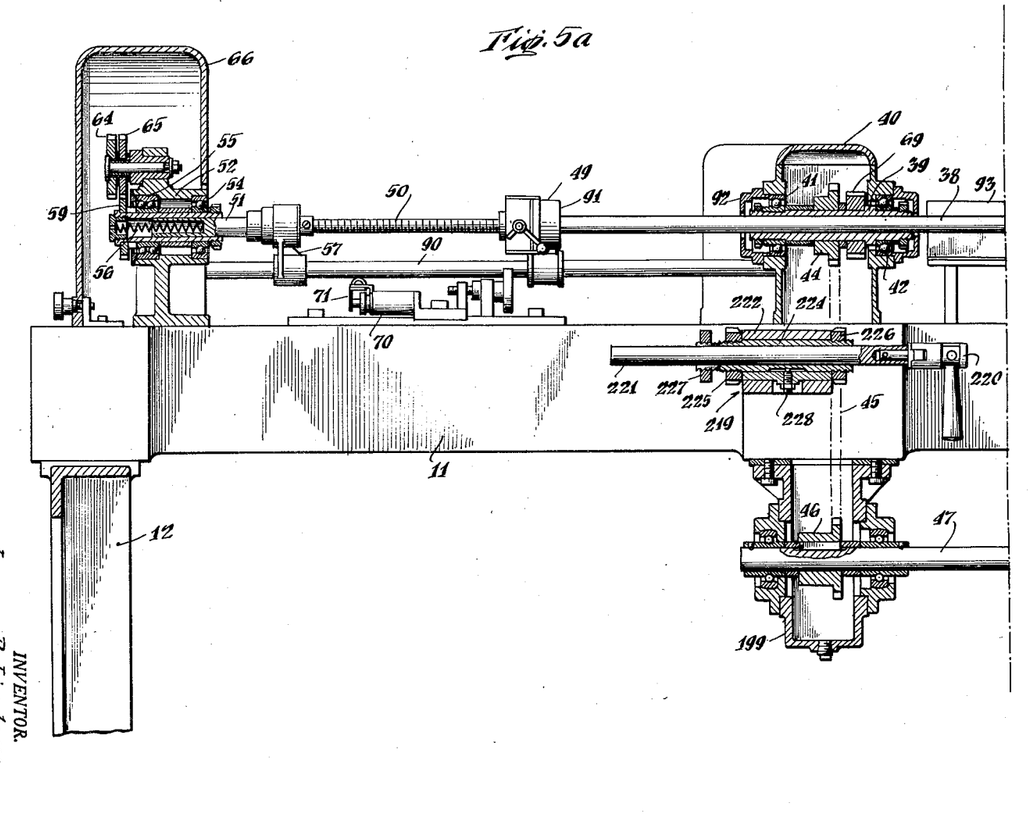
Figures 6, 7B:
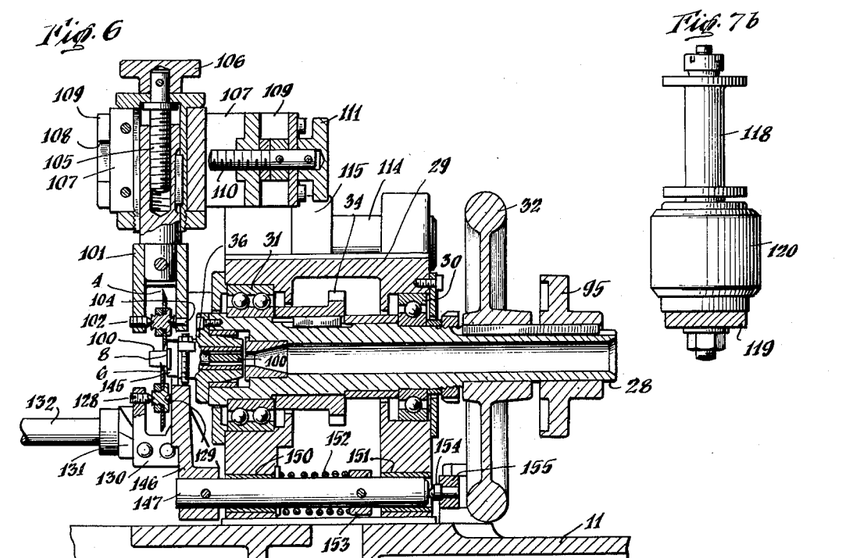
Figures 8, 8A, 14:
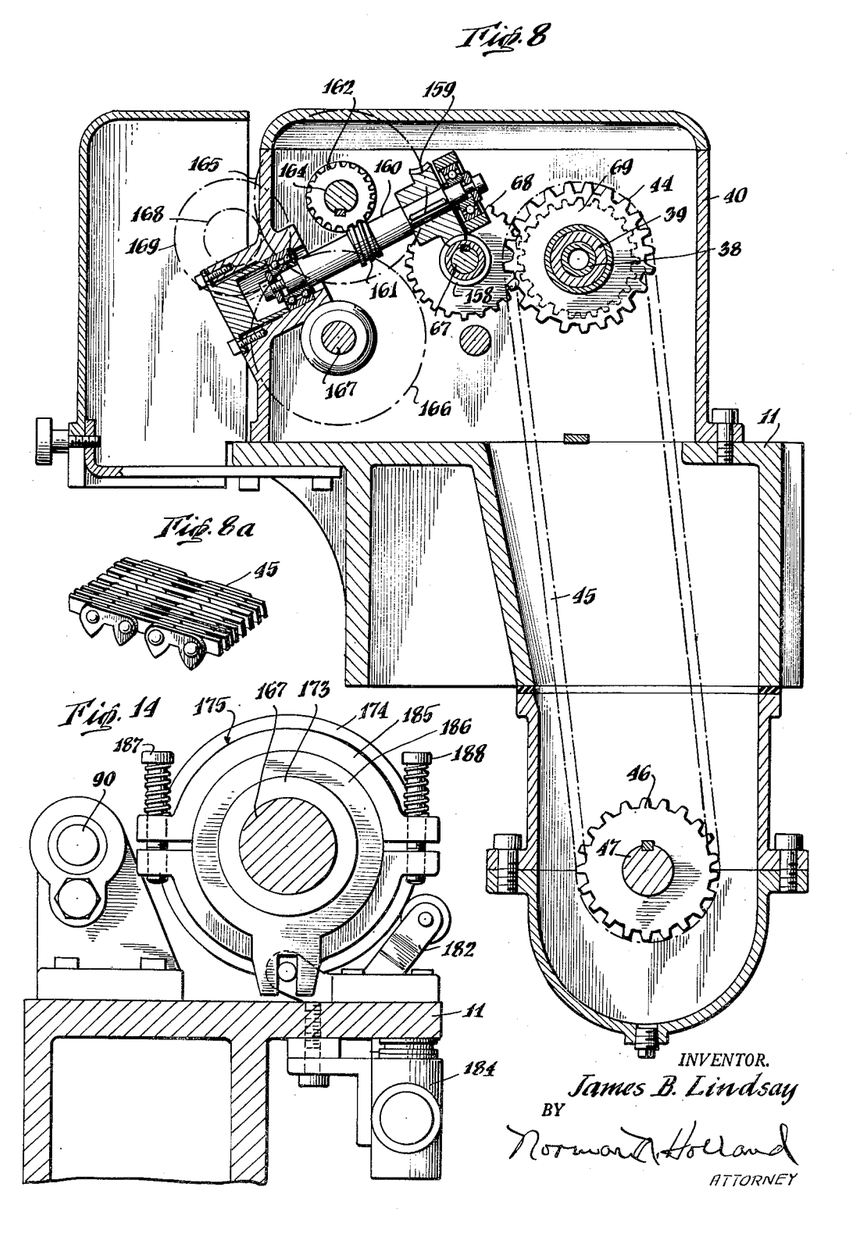
Fig. 8 is a sectional view along the line 8—8 of Fig. 4a showing the worm gear head assembly.
Fig. 8a is a detailed view in perspective of a portion of the silent chain belts.
Fig. 14 is a sectional view along the line 14—14 of Fig. 4b showing the cam shaft brake.
Figure 9:
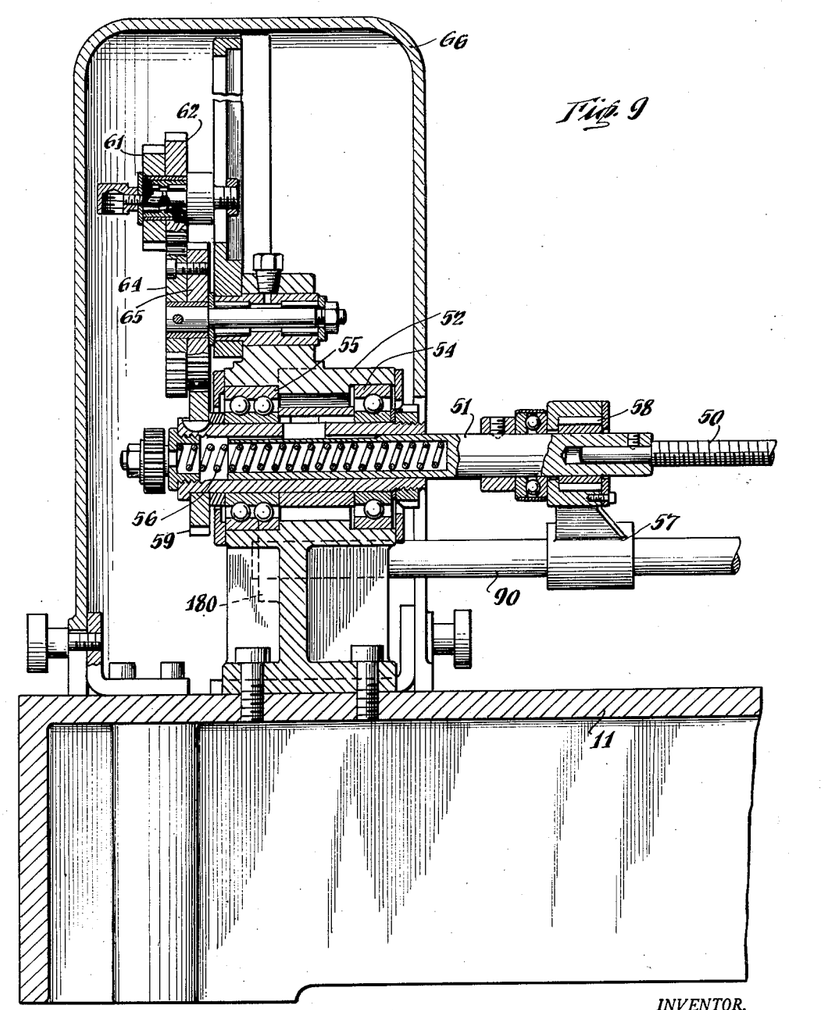
Fig. 9 is a sectional view along the line 9—9 of Fig. 4a showing the tailstock.

In order to feed the side wires 1 through the machine a lead screw mechanism is used (Figs. 4a, 4b, 5a, and 5b). The side wires are engaged by clamp 37 which is mounted on the end of draw sleeve 38. Sleeve 38 is slidably mounted in a collar 39 which is rotatably supported in the worm gear head 40 by two bearings 41 and 42 (Figs. 4a and 5a). The collar 39 and sleeve 38 are rotated by sprocket 44 and silent chain belt 45. Chain belt 45 is driven by sprocket 46 which is driven by drive shaft 47. Yoke 14 and head stock spindle 28 (Fig. 5b) are also driven by drive shaft 47 through sprocket 48, belt 35, and sprocket 34. By giving sprockets 44 and 46 and sprockets 34 and 48 an equal number of teeth the yoke 14 and the sleeve 38 are rotated in synchronism. Chain belts 35 and 45 (Fig. 8a) provide a smooth running, silent coupling with no backlash. Sleeve 38 is rotatably attached to sleeve drive box 49 which is moved by lead screw 50. Drive box 49 will be more fully described later herein. The lead screw 50 is driven by lead screw drive shaft 51 which is slidably mounted in tail stock 52 on bearings 54 and 55 so that it may rotate as well as slide in an axial direction. Lead screw drive shaft 51 normally remains in its extreme right hand position under the force of spring 56. As the lead screw 50 moves the sleeve drive box 49 toward the left, the hollow sleeve 38 is drawn over the lead screw. The lead screw drive shaft 51 may be moved to the left by arm 57 which is rigidly attached to shaft 90 and which is attached to lead screw drive 51 by roller bearing 58 to vary the pitch of the grid winding as will be described hereinafter. Shaft 51 rotates freely in arm 57 but may be moved in an axial direction by arm 57. Lead screw drive shaft 51 is driven by gear 59 which is driven from gear 60 (Fig. 4a) through idler gears 61, 62, 64, and 65 (Fig. 9). The speed of the lead screw drive shaft is adjusted by substituting gears to change the gear ratios in the gear train 60, 61, 62, 64 and 65. The tail stock 52 is enclosed by tail stock cover 66. Gear 60 is fastened on and driven by driver shaft 67 which is driven at constant speed from the rotating collar 39 through gears 68 and 69 in the worm gear head (Fig. 4a).

*Hollow sleeve drive box*

The hollow sleeve drive box 49 (Figs. 4 or 5a, 10, 11 and 12) engages the lead screw 50 and is driven by it from a position adjacent the worm gear head 40 to a position adjacent the tail stock 52. When the drive box 49 nears the tail stock it contacts arm 71 on microswitch 70. This arm opens the microswitch stopping the machine. The wound portion of the grid is now removed from the machine and the drive box together with its attached hollow sleeve 38 is returned by the operator to the start position for a new run. This requires the drive box to be moved on the lead screw 50 to a position adjacent the worm gear head 40.

The drive box 49 (Figs. 10, 11, and 12) has a box-like shell 72 which supports two worm gears 74 and 75 on shafts 76 and 77. Worm gears 74 and 75 are cut to match the lead screw 50. The worm gears are never removed from the lead screw. When the worm gears are locked against rotation on shafts 76 and 77, turning the lead screw moves the drive box. When the worm gears are allowed to turn on their shafts, the drive box may be moved freely along the lead screw by the operator to any desired position.

Figure 10:
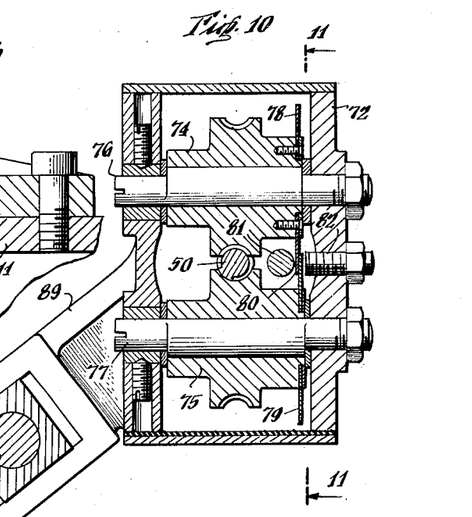
Fig. 10 is a sectional view along the line 10—10 of Fig. 11 showing the hollow sleeve drive box.
Figure 11:
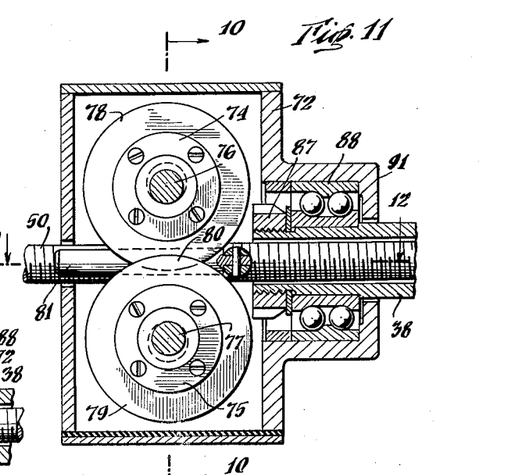
Fig. 11 is a sectional view along the line 11—11 of Fig. 10.
Figure 12:
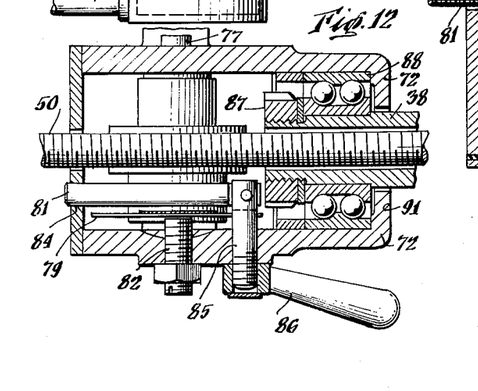
Fig. 12 is a sectional view along the line 12—12 of Fig. 11.
Figure 13:
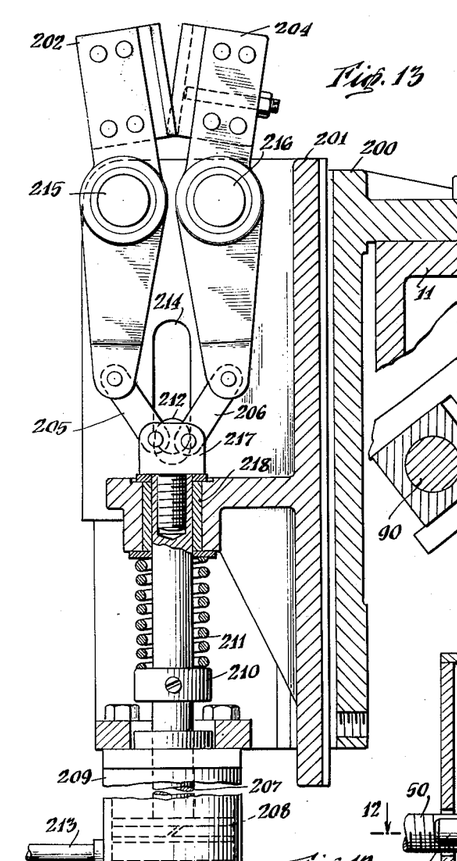
Fig. 13 is an end elevational view partially in section of the grid strip shears.

The locking device for the worm gears includes two thin disk members 78 and 79 attached to the worm gears with overlapping portions 80. Clamp rod 81 is moved against the overlapping portions 80 and it deforms the disks as well as clamps them between itself and screw stop 82 locking the worm gears against rotation. Clamp rod 81 is loosely fitted at one end in hole 84 in shell 72 and is hinged to rod 85 at its other end. Rod 85 is slidably mounted in shell 72 and is threaded at its unhinged end to receive handle 86. Rotation of handle 86 in one direction slides rod 85 out of shell 72 moving rod 81 against the disks 78 and 79 and rotation of handle 86 in the other direction moves rod 85 back into shell 72 causing rod 81 to release the disks. Hollow sleeve 38 is attached to the drive box by screwing nut 87 against the inner race of ball bearing 88. This fastens the sleeve to the drive box in an axial direction while allowing the sleeve to rotate within the drive box. The drive box is held against rotation by arm 89 which is slidably engaged with shaft 90. Use of the worm gears which never leave the lead screw allows the drive box to be returned from its extreme left position to the same starting position for each run since loosening of the worm gears allows free movement of the drive box along the lead screw. Thus, the smooth surface 91 of the drive box 49 may be moved against surface 92 of worm gear head 40 at the start of each run. This represents an improvement over the well known "split-nut" type of drive box. These "split-nut" drives engage the lead screw with an ordinary type of nut which is split across the center so that the two halves may each be disengaged from the lead screw. When the drive box is to be returned to its starting position, the "split-nut" is disengaged from the lead screw and the drive is moved to its new position. The nut must now be reengaged with the end screw. This may move the drive box as much as one half a pitch of the lead screw thread beyond the desired starting point. This changes the leg length of the individual grid elements on the grid strip.

*Notching, winding and peening mechanisms*

The notching, winding and peening mechanisms are shown more particularly in Figs. 4b, 5b, 6 and 7. The side wires pass through the head stock spindle 28 and out its left end through mandrel 100. As the side wires 1 emerge from the mandrel the grid wire 2 is wound on the side wires to form the grid helix. The grid wire is fastened to the side wires by the notching wheel 4 and the peening wheel 6 as described previously with respect to Figs. 1 and 2.

Figures 7, 7A:
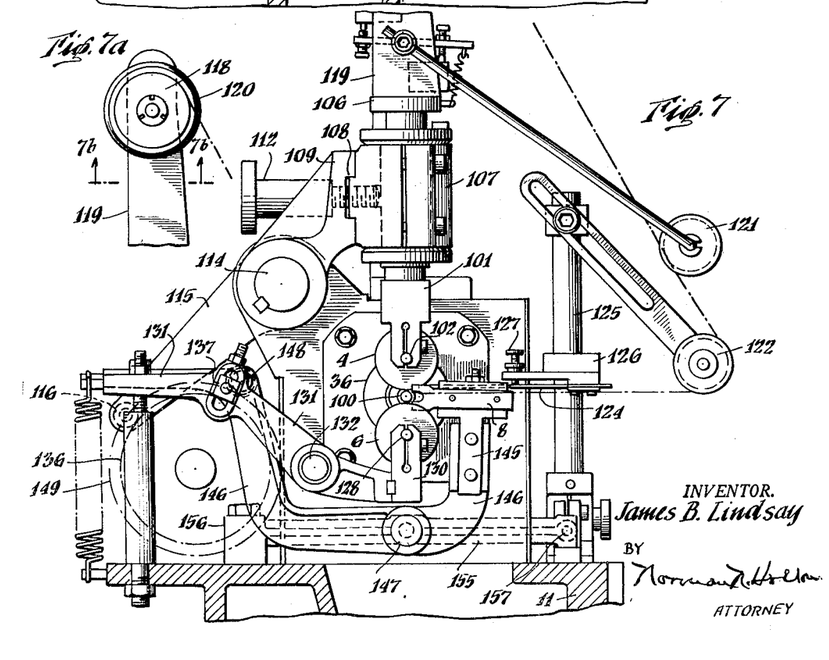
Figs. 7 and 7a are sectional views along the line 7—7 of Fig. 5b showing the headstock and wire guide assembly.

The notching wheel 4 is mounted on notching wheel bracket 101 by notching wheel arbors 102 and 104. As the side wires rotate, their outside edge is notched by the notching wheel 4. The depth of this notch is increased by lowering the notching wheel 4 by the notching wheel height screw 105 which is turned by handle 106.

The bracket 101 is slidably held in bracket 107 which in turn is slidably held in groove 108 of bracket arm 109. Screw 110 which connects arm 109 and bracket 107 moves bracket 107 along groove 108 and thus positions the notching wheel longitudinally in relation to the side wires. Screw 110 is turned by handle 111. Lock handle 112 locks bracket 107 in position after adjustment.

Bracket arm 109 is keyed to shaft 114 which is rotatably held in head stock 29. Lever 115 is keyed also to shaft 114. Lever 115 has a cam follower 116 at its lower end which engages notching wheel cam 117. Thus lever 115 under the action of cam 117 will rotate the notching wheel 4 away from the side wire through the intermediation of shaft 114, arm 109 and bracket 107. The action of the cam shaft will be discussed later in more detail.

After the notch has been formed in the side wire the grid wire 2 is laid into the notch. The rotation of the side wires is used to draw the grid wire onto the side wires. The grid wire is supplied from a spool 118 (Fig. 7a) on post 119. The spool 118 is mounted on the shaft of a hysteresis-magnetic brake 120 which provides a tension control for the grid wire feed. The grid wire is guided by pulleys 121 and 122 to spring wire guide 124 adjustably mounted on post 125. Clamp 126 may be rotated axially on post 125 to adjust the horizontal director of feed of the grid wire. The clamp 126 may be moved vertically on post 125 or adjustment screw 127 may be turned to set the vertical feed angle of the grid wire to the side wires.

The peening wheel 6 is mounted on arbors 128 and 129 in peening wheel bracket 130. Bracket 130 is fastened to peening wheel lever 131 which rotates on shaft 132. Collars 134 and 135 (Fig. 4b) which are rigidly fastened to shaft 132 prevent movement of the peening wheel lever 131 in an axial direction along shaft 132. Peening wheel engagement cam 136 rotates lever 131 through cam follower 137 (Fig. 4b) and thereby swings the peening wheel 6 out of engagement with the side wires during periods where no peening action is desired.

When the pitch of the grid winding is changed the position of the peening wheel must be adjusted in a direction parallel to the side wires. In order to provide this adjustment automatically shaft 132 is slidably mounted in bearings 138 and 139. Cam follower bracket 140 is rigidly attached to shaft 132. Cam follower 141 rides on peening wheel pitch cam 142. Spring 144 holds the cam follower tightly against cam 142 so that cam 142 determines the position of the peening wheel. Cam 142 may be cut to allow the peening wheel to follow a non-uniform pitch pattern, where such a pattern is desired.

The swaging tool 8 is held by swaging tool bracket 145 which is attached to swaging lever 146. Lever 146 is rigidly fixed to shaft 147 (Fig. 6) and the shaft 147 and lever 146 are rotated by the action of cam follower 148 and swaging tool cam 149. Shaft 147 is mounted in bearing 150 and 151. Spring 152 and collar 153 (Fig. 6) positions the shaft against pin 154. Pin 154 may be adjusted by turning the hinged member 155 in which pin 154 is set about its hinge 156 by adjusting screw 157 (Fig. 7). This adjusts the axial positions of shaft 147 and therefore the positions of the swaging tool. As seen in Fig. 1, the swaging tool has two cutting edges which contact the side wires simultaneously. This makes the swages 10 cut in the side wires 1 exactly opposite each other so that a mica cap placed against the swages assumes a position exactly at right angles with the side wires. Most present machines use a single cuttting edge to make the swages. This means that one side wire must be swaged first and that the other side wire will only be swaged after it has rotated a fraction of a turn and thus has been moved longitudinally by the lead screw. This will cause the swages to be displaced from each other and causes the mica cap to vary from the desired right angle position relative to the side wires.

Where more than two side wires are used the swage is preferably made on only two of the side wires.

Cam shaft

The cam shaft 167 (Figs. 4a, 4b, 5a and 5b) is driven to make one complete revolution for each grid element that is wound on the larger grid strip. Thus if in one run of the machine a grid strip is made which is long enough to be cut into twenty-four grid elements, the cam shaft will make twenty-four revolutions during this winding operation. If the machine is set to wind a grid element having one hundred turns the cam will turn approximately one one-hundredth the speed of the side wires. The cam shaft is driven from the driver shaft 67 through a reduction gear train in worm gear head 40 (Figs. 4a, 5a, and 8). The reduction gear train consists of worm 158 of shaft 67 (Fig. 4a) which meshes with worm gear 159 on shaft 160 (Fig. 8). Worm 161 on the other end of shaft 160 meshes with worm gear 162 on shaft 164 (Fig. 8). Gear 165 on the end of shaft 164 is connected to gear 166 (Fig. 8) on the end of the cam shaft 167 through idler gears 168 and 169 (Fig. 4a). Cam shaft 167 is supported on bearings 170 and 171. Cam shaft 167 has mounted on it variable pitch cam 172, pilot light cam 174, cam shaft brake 175, peening wheel pitch cam 142, peening wheel engaging cam 136, swaging tool cam 149 and notching wheel cam 117. Variable pitch cam 172 is ring shaped and is mounted upon hub 176 which is fastened to cam shaft 167. Cam follower 177 mounted in cam follower bracket 178 cooperates with cam 172 to move shaft 90 in an axial direction. Cam follower bracket 178 is rigidly mounted on shaft 90 which is slidably mounted in bearings 179 and 180 (Fig. 9). Lead screw drive shaft 51 is connected through arm 57 to shaft 90. The movement of cam follower 177 is thus transferred to lead screw 50 and the side wires are moved by the combined steady drive of the lead screw and the variable drive of the variable pitch cam.

The pilot light cam 174 (Fig. 4b) provides an indication of the position of the grid winding with relation to the end of the grid strip. Shears 181 are used to cut off the completed strip when the lead screw has reached the end of its run. It is necessary to cut the strip in the unpeened area between the individual grid elements in order not to spoil the end grid element. The cam 174 is notched so that lever 182 (Fig. 14) closes the micro switch 184 when the grid strip is so positioned that the shears 181 will cut the grid strip midway between individual grid elements. Micro switch 184 turns on a suitable indicator lamp to notify the operator that the strip is in a proper cutting position.

Cam shaft brake 175 (Figs. 4b and 14) is provided to eliminate back lash in the rotation of the cam shaft. The drag action of the brake insures a smooth, vibration free, rotation of the cam shaft. Brake frame 185 encloses a leather brake band 186. The brake tension is adjusted by spring loaded screws 187 and 188. The inner surface of leather band 186 engages the cam hub 173.

The peening wheel pitch cam 142 is mounted on hub 189 (Fig. 4b). As previously discussed under the operation of the peening wheel, cam 142 adjusts the peening wheel position for pitch changes caused by cam 172. Cam 142 operates through cam follower 141, bracket 140, shaft 132 and lever 131 to shift the peening wheel 6 in a direction parallel to the side wire travel. Peening wheel engagement cam 136 is mounted upon hub 190 which is attached to cam shaft 167. The peening wheel cam 136 may be mounted on hub 190 (Fig. 4b) with a second cam 136a to provide for additional control of the peening wheel 6. Thus, cam 136 may be shaped to remove the peening wheel from engagement with the side wires for a given period. Cam 136a may be shaped to remove the peening wheel for a different period. The relation between the two periods may be adjusted by rotation of cam 136a relative to cam 136 when they are mounted on hub 190. If the two periods are partially overlapped, one operation period of adjustable length is obtained. As before noted, cam 136 operates to remove the peening wheel 6 from engagement with the side wires through the operation of cam follower 137 and lever 131.

Swaging tool cam 149 (Fig. 4b) is similarly mounted upon a hub 191 and has an auxiliary cam 149a to allow adjustment of the swaging period by rotation of cam 149a relative to cam 149. The swaging tool cam operates through cam follower 148, lever 146 and bracket 145 to move the swaging tool 8 in and out of engagement with the side wires.

The notching wheel cam 117 (Figs. 4 and 7) is mounted upup hub 192. An auxiliary cam 117a is mounted on cam 117 to provide for adjustment as described above with cam 136. The notching wheel assembly is rotated to bring the notching wheel 4 in and out of engagement with the side wires by the operation of cam follower 116 mounted on lever 115.

Main driving mechanism

The main electric driving motor 194 is attached to legs 12 (Fig. 5b). Pulley 195 on the motor drives shaft 47 through pulley 196 and belt 197. The shaft 47 is mounted in shaft boxes 198 and 199. The head stock spindle 28 is driven from shaft 47 by sprockets 34 and 48 through silent chain drive 35. The hollow draw sleeve 38 is driven from shaft 47 by sprockets 44 and 46 through silent chain drive 45. Since the hollow draw sleeve 38 and the head stock spindle are rotating opposite ends of the grid strip being wound they must remain in a fixed relation with each other and therefore must be exactly synchronized. This is done by matching the number of teeth on the sprockets at opposite ends of the silent chain drives and by causing the chain drives to have an extremely close fit to eliminate back lash. Both the lead screw and the cam shaft are driven from the hollow draw sleeve as described above in the description of these functions. In order to lubricate the drive for the head stock spindle, the shaft box 198 is made oil tight. Similarly, the opening for the chain drive 35 through bed 11 and the head stock 29 are also made oil tight. This oil tight space is then filled with oil to provide lubrication for the head stock drive. The other shaft box 199, the opening in bed 11 for the chain drive 45 and the worm gear head 40 are made oil tight to allow the worm gear and head drive and cam shaft gearing to run in an oil bath. These two oil baths for the head stock and the worm gear head are made leakproof. A magnetic disk brake 193 of well known construction is attached to the drive motor. This brake is switched on at the same time that the motor is switched off. The brake stops the rotation of the side wires within half a turn from the time the motor is switched off. This allows the automatic micro switch 70 to be accurately set so that the run can be stopped within a half turn of the side wires from the position for the cutters to cut midway between individual grid elements on the grid strip. This minimizes time used by the operator in turning the machine by hand to the correct cutting position.

Cutting and stretching mechanisms

The cutting and stretching mechanisms are shown more particularly in Figs. 4a, 4b, 5a, 5b and 13.

When the hollow sleeve drive box 49 has reached a position adjacent the tail stock 52, the micro switch 70 stops motor 194 and the machine is stopped. The completed portion of the grid winding must now be removed from the machine so that the drive box may be returned to a position adjacent the worm gear head 40 for another run. This is done by cutting the side wires and grid wire at a point just beyond the peening wheel and then removing a completed grid strip by opening clamp 37.

Trough 93 is mounted on bed 11 to catch and hold the several grid strips.

The cutting is done by shears 181 (Fig. 13) which are mounted on bed 11 by shears guide 200 and shear slide 201. The slide 201 moves vertically on guide 200 so that the shears may be moved up to the cutting position when required and then return downward and out of way within bed 11 after the cutting has been completed. Shears guide 200 is adjusted by screw 183. Shear blades 202 and 204 are hinged at 215 and 216 to slide 201 and are attached by link members 205 and 206 through fulcrum 217 to shaft 207. Shaft 207 has an attached piston 208 which is fitted into air cylinder 209. Shaft 207 slides freely in sleeve 218 and supports shears slide 201 through collar 210 and spring 211. Pin 212 on the slide 201 moves in slot 214 in the shears guide 200. Thus the amount of upward movement of slide 201 is fixed by the length of slot 214. When the operator desires to cut off the completed grid strip, he actuates a suitable solenoid valve which admits compressed air into cylinder 209 through inlet 213. This raises shaft 207 vertically. Shaft 207 carries shears slide 201 upward by the action of spring 211 until pin 212 reaches the end of slot 214. Since the slide 201 can be raised no further, spring 211 compresses allowing shaft 207 to slide through sleeve 218 and raise fulcrum 217. Links 205 and 206 then force the lower end of shears 202 and 204 outwardly causing the upper cutting edges to close and to sever the grid strip. The shears are thus first raised into position and then closed to cut the grid by admitting compressed air to the cylinder 209. When the cutting is completed, the air is released from beneath the piston and the shears fall back to their original position. By locating the shears within the bed 11 when they are not in use, the area around the peening and notching wheels is left free and uncluttered so that the operator has an unobstructed view which facilitates adjustment of the operation of the machine and the hollow draw sleeve 38 and the grid strip do not have to pass between the shear blades. These shears represent an improvement over known types which do not have the initial lift action but which remain in cutting position on either side of the side wires obstructing the operator's view and movements.

After the completed grid strip has been cut off, there may be a slight curvature in the side wires. This is removed by the stretching device 219 (Figs. 4a, 4b, 5a, and 5b) located on the front of bed 11. The left end of the stretching device has clamp 220 attached to rod 221 which is mounted in bracket 222. Rod 221 is tightly fitted with sleeve 224 which is threaded on both ends. Nuts 225 and 226 move the sleeve into the desired position where it is locked by jam nut 227 and set screw 228. The right end of the stretching device has clamp 229 mounted on rod 230 which is slidably held by bracket 231. Handle 232 is pivoted on the right end of rod 230. Spring 234 acting against collar 235 causes the rod 230 to hold curved surface 236 (Fig. 4b) of handle 232 against surface 237 of bracket 231. Surface 236 is so curved that as the handle 232 is turned from a position at right angles with rod 230 to a position in line with rod 230, the rod is moved to the right the distance which it is desired to stretch the completed grid strip. To operate the stretcher the operator moves handle 232 to a position at right angles to rod 230. The grid strip is then attached by its ends to clamps 220 and 229. The handle 232 is then turned into line with rod 230 stretching and straightening the grid strip.

*Operation*

When the cams have been cut and mounted, the spacing of the notching, peening and swaging tools adjusted and the speed of the cam shaft and lead screw set, the operator begins the grid winding operation. The side wires 1 from the spools 15 and 16 are led thru the coupling 26 and head stock 29 including mandrel 100 to clamp 37 on the hollow draw sleeve 38. The grid wire 2 is led down from spool 118 over pulleys 121 and 122 and over spring wire guide 124 to the side wires 1. A few turns of the grid wire are now wound around the side wires by hand. The operator next turns the hand wheel 32 a few turns and observes to see that the grid wire is entering the notches 5 and is being fastened by the peening wheel 6. Motor 194 is now started to begin the automatic winding of the grid strip. The hollow sleeve drive box draws the side wires toward the left end of the machine until the drive box contacts arm 71 and opens micro switch 70 stopping the motor. The micro switch has been set to stop the machine so that the side wires are within a turn or two of their correct position for cutting by the shears 181. The pilot light cam 174 operates a suitable pilot light to show the operator when the cutting point or the end of the grid strip is reached. The operator turns the machine by hand the last few turns required and then operates the shears to cut the side wires.

The completed grid strip is removed from clamp 37 and is placed in stretching device 219 between clamps 220 and 229. The stretching handle 232 is then operated to straighten the grid strip. To wind another grid strip, the operator loosened lock handle 86 on the hollow sleeve drive box 49. This allows the hollow sleeve 38 to be returned toward the head stock so that clamp 37 may regrip the side wires at the point of severance. A portion of a wound grid element remains on the side wires in the machine so the operator has only to close clamp 37 on the end of the side wires and turn on motor 194 to begin the next run by continuing the winding of the grid element portion.

In order to set the pitch of the grid, the speed of rotation of the lead screw is changed by changing the gear ratios in the gear chain 59, 60, 61, 62, 64, 65 between drive shaft 67 and lead screw drive shaft 51 in the tail stock 52.

The cam shaft 167 is set to make one revolution during the winding of one grid element on the grid strip and the characteristics of the individual grid elements are controlled by the cams on the cam shaft. The revolution time of the cam shaft and thus the number of turns of grid wire on a grid element is adjusted by changing the gear ratios in the gear train 165, 166, 168 and 169 in the connection between the cam shaft 167 and the driver shaft 67. Between the individual grid elements on the grid strip, it is desirable to leave the grid wires unfastened. During this interval the notching wheel cam 117 and the peening wheel cam 136 raise the notching and peening wheels from the side wires to prevent notching and peening or the peening wheel only may be raised by cam 136 to prevent peening only. The swaging tool 8 is moved against the side wires automatically by the swaging tool cam 149 two times during the winding of each grid element to form the mica stops 10. The variable pitch cam 172 is associated with the lead screw to provide variations in the pitch of the grid winding when desired. When this cam is used to vary the pitch of the grid the peening wheel pitch cam 142 is used to adjust the peening wheel in accordance with the pitch variations.

It will be seen that the present invention provides a new and improved machine for manufacturing grid elements. The machine will produce grid elements of extremely small size with high pitches and close tolerances. It will operate at speeds as high as 1500 R. P. M. and will handle pitches as high as 500 turns per inch. Once the machine has been adjusted it may be run by an inexperienced operator.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

While the drawings, illustrating a preferred embodiment of the invention, utilizes two side wires for simplicity, it will be understood that the invention is applicable to the winding of grids polygonal in shape with any desired number of sides and that there is no intention of limiting the invention to any particular number of side wires.

Having thus described my invention, I claim:

1. A drive means for a grid winding machine having a rotating side wire feeding spindle and a rotating draw sleeve spaced from and mounted concentrically with the spindle to draw side wires through the spindle as the draw sleeve is moved by a lead screw and having grid forming tools mounted between the spindle and the draw sleeve comprising a drive motor, a first belt coupling means between said drive motor and said side wire feeding spindle, a second belt connection means between said motor and said draw sleeve whereby said side wire feeding spindle and said draw sleeve are rotated in synchronism, a gear means connecting said draw sleeve and the lead screw whereby the lead screw is turned at a rate proportional to the rate of rotation of said draw sleeve, and a gear and cam means connecting said draw sleeve and said grid forming tools whereby the motion of the tools is synchronized with the rotation of the side wire moving sleeve, the spindle and the lead screw.

2. The drive means as claimed in claim 1 in which said gear and cam means connecting said draw sleeve and said grid forming tools comprises a cam shaft mounting the tool activating cams, and a step-down gear means coupling said draw sleeve and said cam shaft whereby said cam shaft is rotated at a constant speed which is a predetermined fraction of the draw sleeve rotational speed.

3. The drive means as claimed in claim 2 in which said step-down gear means comprises one or more meshing worm and worm gears whereby a compact smooth running speed step-down is provided at an exactly predetermined ratio of cam shaft and draw sleeve rotation speeds.

4. A drive means for a grid winding machine having a rotating side wire feeding spindle and a rotating draw sleeve spaced from and mounted concentrically with the spindle to draw side wires through the spindle as the draw sleeve is moved by a lead screw and having cam actuated grid forming tools mounted between the spindle and the draw sleeve comprising a drive shaft adapted for connection to a drive motor, a first coupling between said drive shaft and said side wire feeding spindle, a second connection between said shaft and said draw sleeve whereby said side wire feeding spindle and said draw sleeve are rotated in synchronism, a gear means connecting said draw sleeve and the lead screw whereby the lead screw is turned at a rate proportional to the rate of rotation of said draw sleeve, a gear and cam means connecting said draw sleeve and said grid forming tools, and said gear and cam means comprising an actuating cam for each grid forming tool, a rotatably mounted cam shaft mounting said tool actuating cams, and a step-down gear train operatively coupling said draw sleeve and said cam shaft including one or more meshing worm and worm gears whereby the motion of the tools is synchronized with the rotation of the side wire moving sleeve, the spindle and the lead screw.

5. A drive means as claimed in claim 4 in which said first coupling between said drive shaft and said side wire feeding spindle and said second connection between said shaft and said draw sleeve both comprise metal silent chain drives whereby back-lash between said drive shaft and said side wire feeding spindle and draw sleeve is substantially eliminated.

6. A drive means as claimed in claim 5 having a sealed enclosure surrounding each of said chain drives adapted to contain lubricating oil whereby said chain drives run in an oil bath.

7. In a grid winding machine having a rotating draw sleeve moved by an elongated rotating lead screw, a drive box for connecting said draw sleeve and said lead screw comprising a box member surrounding the lead screw, a pair of worm gears in said box members on opposite sides of the lead screw having their threads in contact with the threads of the lead screw, each of said worm gears being rotatably mounted on shafts which have their opposite ends mounted on said box member and which are positioned at right angles to the lead screw, a stabilizing arm connected to said box member adapted to slidably engage an elongated shaft member to stabilize said drive box on said lead screw, and brake means for said worm gears comprising a first flexible disk attached to and mounted concentrically with one of said worm gears, a second flexible disk attached to and mounted concentrically with the other of said worm gears with its outer portion spaced from and in overlapping relationship with the outer portion of said first disk, clamping means adjacent the overlapping portions of said disks having movable gripping members adapted to removably grip the overlapping portions of said flexible disks thereby clamping them together to prevent rotation of said worm wheels on their mounting shafts whereby rotation of the lead screw moves the drive box lengthwise thereof.

8. The drive box as claimed in claim 7 in which said worm gear mounting shafts are eccentrically mounted on said box member whereby rotation of said worm gear mounting shafts varies the relative positions of the lead screw and worm gear teeth.

References Cited in the file of this patent

UNITED STATES PATENTS

| | | |
|---|---|---|
| 447,713 | Sponsel | Mar. 3, 1891 |
| 1,407,160 | Klausmeyer | Feb. 21, 1922 |
| 1,478,071 | Trimble | Dec. 18, 1923 |
| 1,665,227 | Smith | Aug. 10, 1928 |
| 1,875,170 | Snow | Aug. 30, 1932 |
| 1,970,599 | Franke | Aug. 21, 1934 |
| 1,994,307 | Flaws | Mar. 12, 1935 |
| 2,181,288 | Washburn | Nov. 28, 1939 |
| 2,188,906 | Lackey | Feb. 6, 1940 |
| 2,425,615 | Van Sant | Aug. 5, 1947 |
| 2,426,522 | Porter | Aug. 26, 1947 |
| 2,441,228 | Schneider | May 11, 1948 |
| 2,479,019 | Ochtman | Aug. 16, 1949 |
| 2,480,677 | Sheffield | Aug. 30, 1949 |